US007226268B2

United States Patent
Gustafson et al.

(10) Patent No.: US 7,226,268 B2
(45) Date of Patent: Jun. 5, 2007

(54) FACEPLATE

(76) Inventors: John Gustafson, Fall Creek, WI (US) 54742; Michael Schumacher, 1179 27th St., Chetek, WI (US)

( * ) Notice: Subject to any disclaimer, the term of this patent is extended or adjusted under 35 U.S.C. 154(b) by 0 days.

(21) Appl. No.: 10/877,272

(22) Filed: Jun. 25, 2004

(65) Prior Publication Data

US 2006/0018746 A1   Jan. 26, 2006

(51) Int. Cl.
*B66F 19/00*   (2006.01)
(52) U.S. Cl. ............................ 414/723; 37/468; 37/406
(58) Field of Classification Search ................ 414/723, 414/729, 703, 912; 37/468, 406; 172/272–275; 294/86.41
See application file for complete search history.

(56) References Cited

U.S. PATENT DOCUMENTS

| | | | | |
|---|---|---|---|---|
| 3,432,184 | A * | 3/1969 | Tweedy | 172/272 |
| 5,657,825 | A * | 8/1997 | Englund | 172/439 |
| 6,655,899 | B1 * | 12/2003 | Emerson | 414/729 |

* cited by examiner

*Primary Examiner*—Donald Underwood
(74) *Attorney, Agent, or Firm*—Jacobson & Johnson

(57) ABSTRACT

A faceplate having a set of skid steer receiver attachment points to permit an all-purpose agricultural tractor with a three-point hitch or front end loader to operably connect to off-the-shelf skid steer attachments so that the agricultural tractor can utilize off-the-shelf skid steer attachments with the faceplate containing a cylindrical housing to permit rotation of a tool mounted therein without removing the tool from the faceplate and one embodiment including a notched chain bar having notches extending generally normal to the hitch faceplate and a further embodiment including a universal tractor mount.

14 Claims, 18 Drawing Sheets

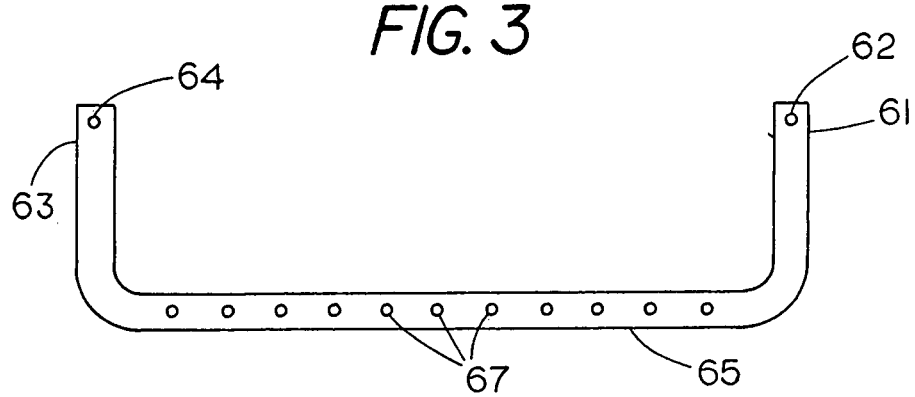
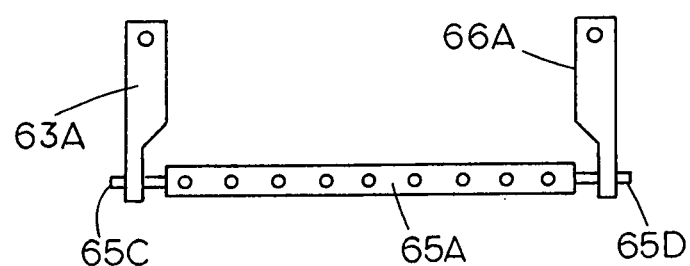
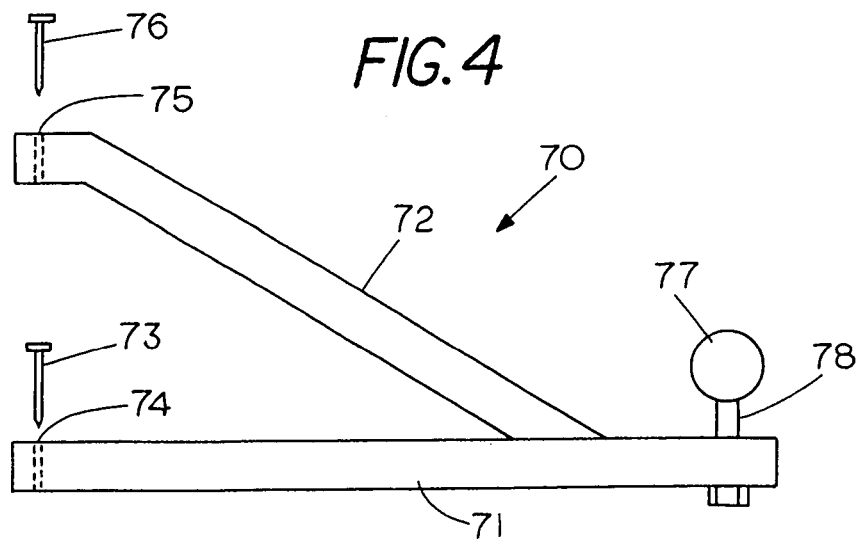

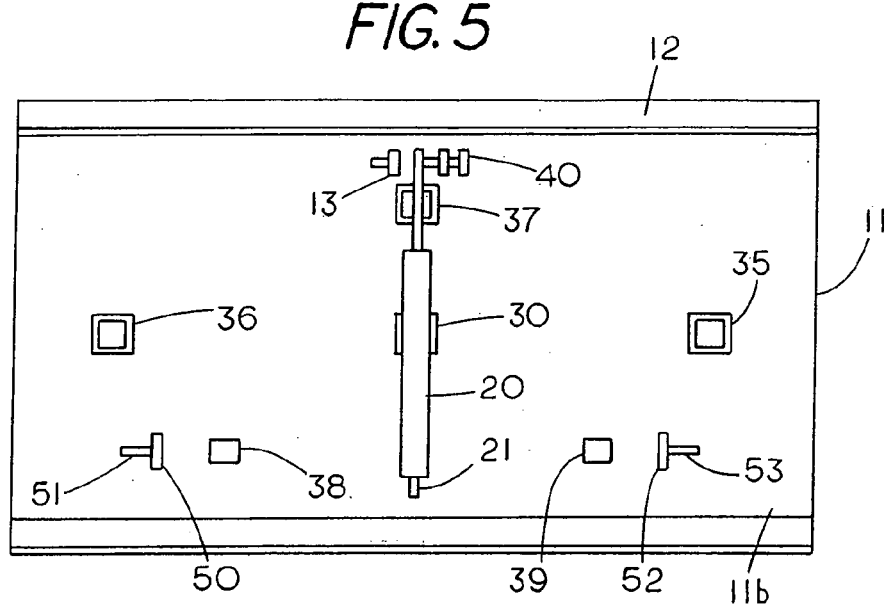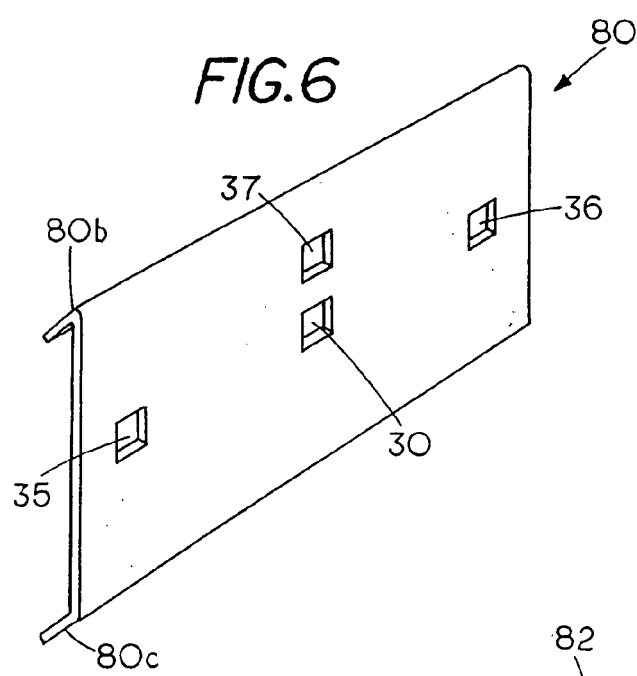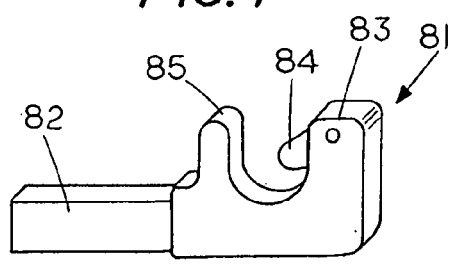

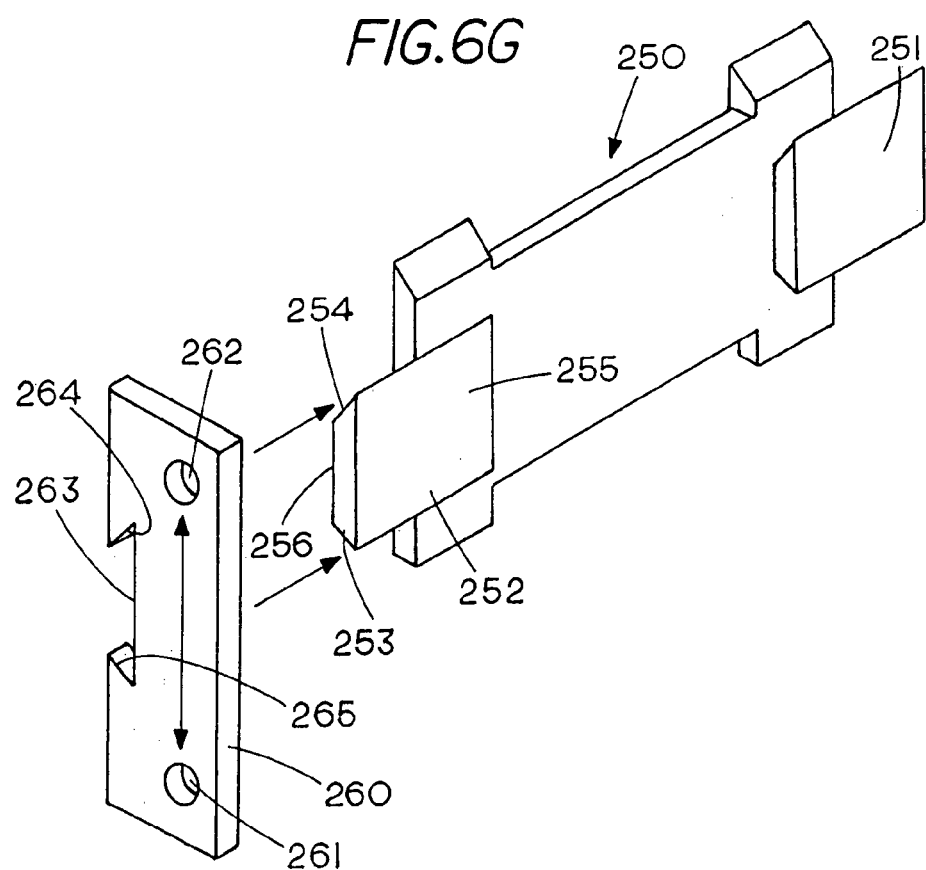

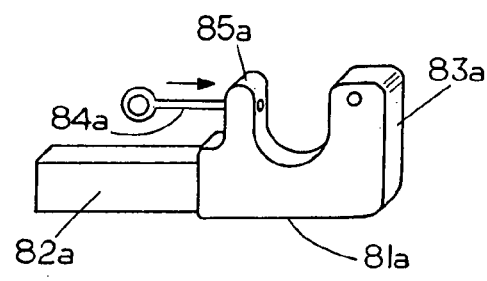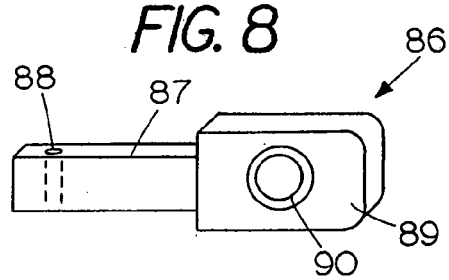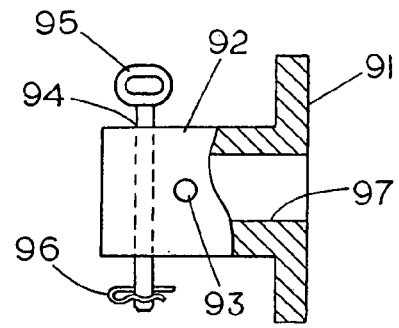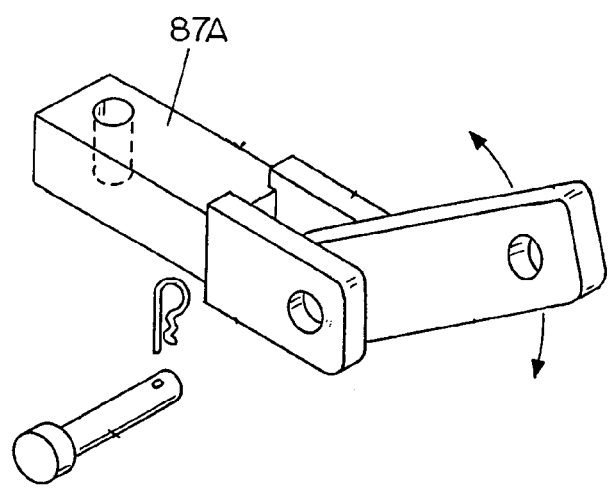

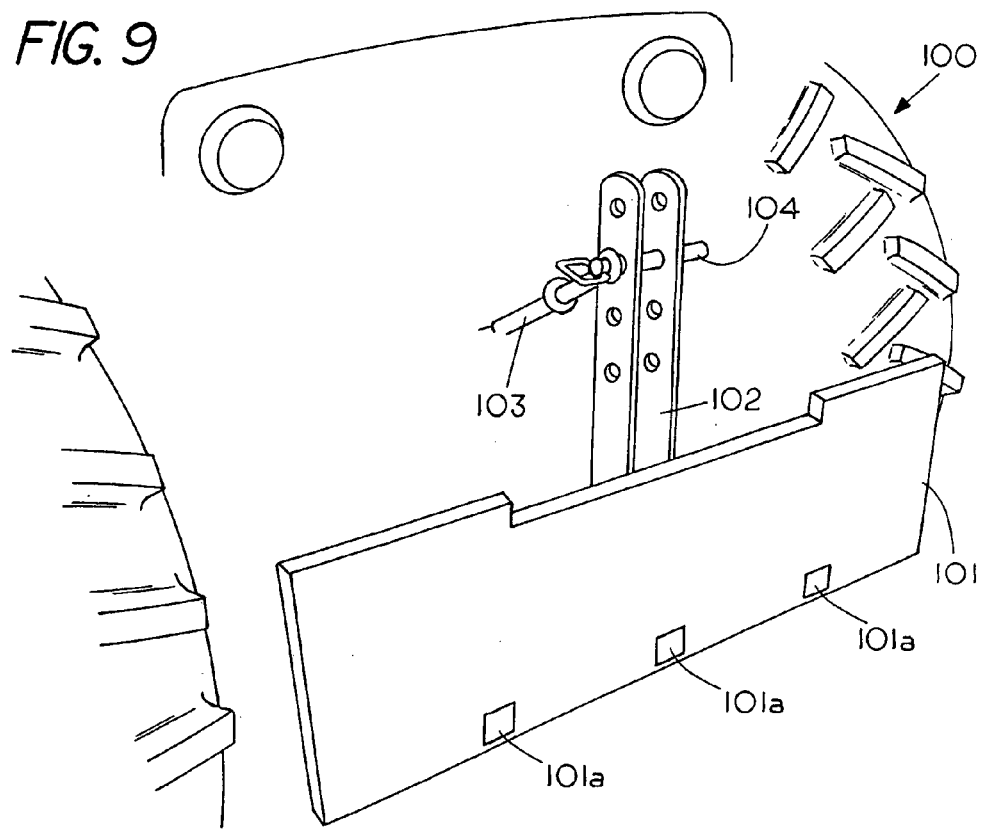
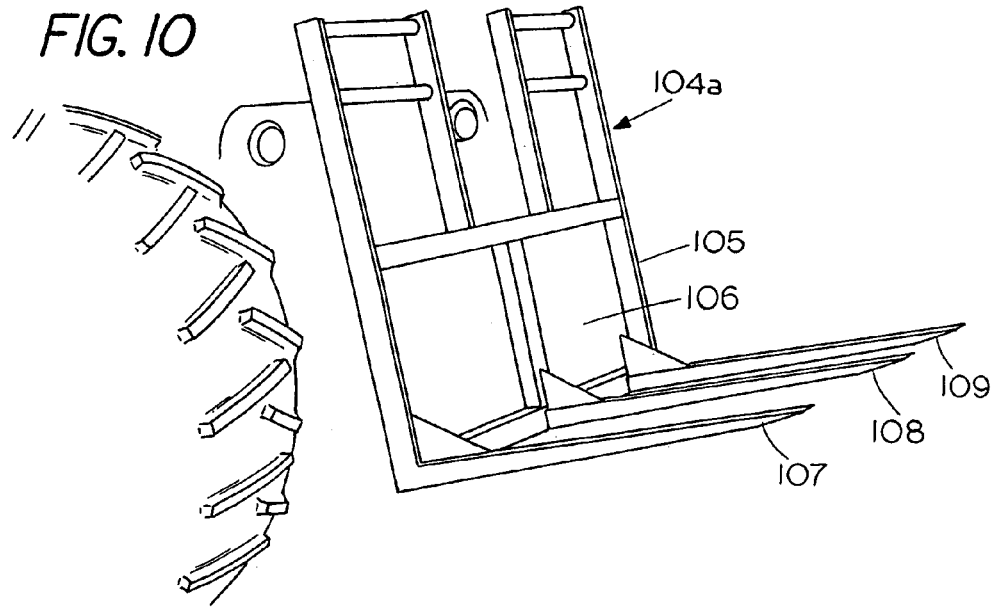

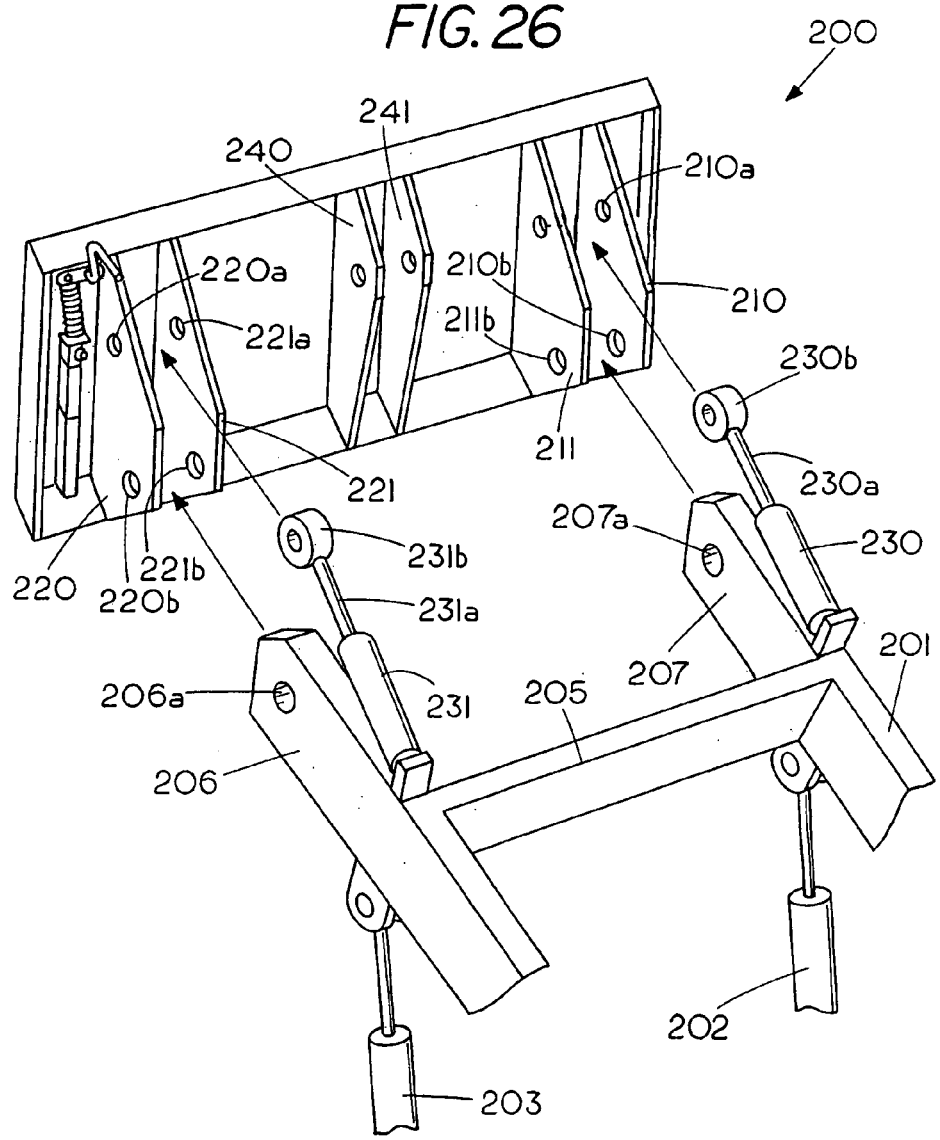

FACEPLATE

CROSS REFERENCE TO RELATED APPLICATIONS

This application claims priority from John Gustafson provisional application 60/437,076 filed Dec. 30, 2002, titled Three-Point Hitch Faceplate and John Gustafson regular patent application Ser. No. 10/440,649 filed May 19, 2003 titled Three-Point Hitch Faceplate.

FIELD OF THE INVENTION

This invention relates generally to apparatus to allow a user to use specialty equipment available for skid steer loaders on a conventional vehicle such as an agricultural tractor with a three-point hitch or front loader.

STATEMENT REGARDING FEDERALLY SPONSORED RESEARCH OR DEVELOPMENT

None

REFERENCE TO A MICROFICHE APPENDIX

None

BACKGROUND OF THE INVENTION

Skid steer machines are known and widely used for many tasks. The skid steer machines are compact and lack any steerable wheels. In contrast to machines that have steerable wheels the skid steer maneuvers by stopping or slowing the rotation of one set of side wheels while allowing the other set of side wheels to rotate. The skid steer machines are extremely popular for use in special operations. As a result, a number of different attachments have been created to allow the skid steer machine to perform different tasks. For example, in one application a bucket is attached to the front of the skid steer machine and in another application a blade and in still other applications forks can be attached to allow the skid steer machine to be used as a fork loader.

One of the disadvantages of the skid steer machines is that the skid steer machines are relatively expensive and the equipment used with the skid steer machines is specialized. Consequently, the use of skid steer machines and attachments to skid steer machines is limited to specific industries. Since some skid steer activities are of a one time usage there has developed a market for rental of attachments for skid steer loaders.

A common source of power on a farm is a tractor which has a rear three-point hitch for attachment of farm equipment thereto. Agricultural tractors are well known and can be used as a source of power for various agricultural equipment. The three-point hitch on the tractors are suitable for attaching farm equipment thereto. Unfortunately, the farm tractors are not suitable for use with skid steer attachments. From time to time an owner of an agricultural tractor may need to perform a specific task which could be performed with an available attachment for a skid steer loader. The present invention provides a three-point hitch faceplate that mounts to the three-point tractor mounts to enable an operator to engage and operate any of the skid steer attachments using the tractor as a source of power.

SUMMARY OF THE INVENTION

A faceplate having a set of skid steer receiver attachment points to permit an all-purpose agricultural tractor with a three-point hitch or front loader to operably connect to an off-the-shelf skid steer attachments so that the agricultural tractor can utilize the off-the-shelf skid steer attachments with the faceplate containing a cylindrical housing to permit rotation of a tool therein without removing the tool from the faceplate and a notched chain bar having notches extending generally normal to the faceplate for securing chains thereto. To provide universal attachment to various tractors the faceplate includes wings for two way engagement with the faceplate and for engagement with the attachment points on the tractor.

BRIEF DESCRIPTION OF THE DRAWINGS

FIG. 3 is a top view of a drawbar attachment for the three-point hitch faceplate of FIG. 1;

FIG. 3A shows an alternate embodiment of a hitch having a pivotable drawbar.

FIG. 4 is a trailer hitch attachment for the three-point hitch faceplate of FIG. 1;

FIG. 5 is a rear view of the three-point hitch faceplate of FIG. 1;

FIG. 6 is a perspective of an alternate embodiment of a three-point hitch faceplate;

FIG. 6G is a perspective view of a universal tractor attachment for a faceplate of the present invention;

FIG. 7 is a perspective view of a hook for securing to the three-point hitch faceplate;

FIG. 7A is an alternate embodiment of a hook and extension;

FIG. 8 is a perspective view of loop type attachment device;

FIG. 8A is a partial side view showing the housing and pin for locking an attachment to the three-point hitch faceplate;

FIG. 9 is a perspective showing the three-point hitch faceplate mounted to the three-point hitch of a tractor;

FIG. 10 is a perspective showing a pallet fork attached to the three-point hitch faceplate;

FIG. 26 is a perspective view of a faceplate for attachment to the front end of tractor loader.

DESCRIPTION OF THE PREFERRED EMBODIMENT

Figure 1:
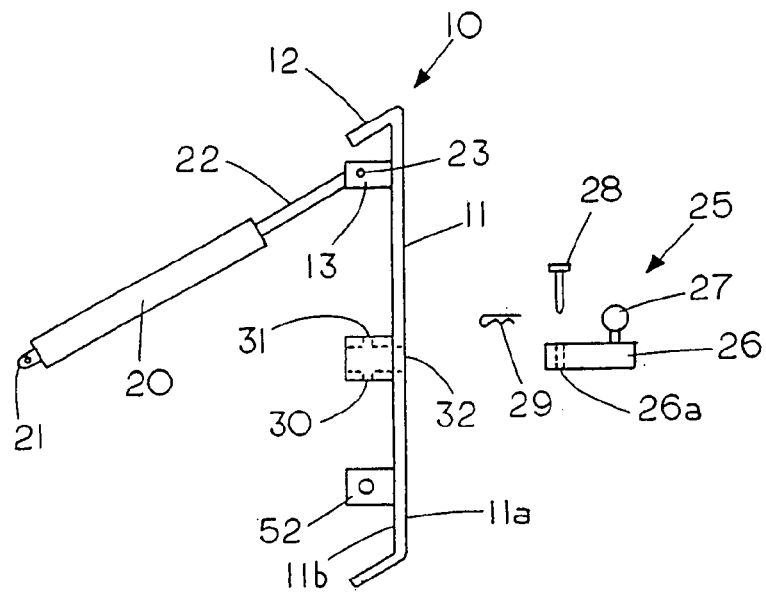
FIG. 1 is a side view of my three-point hitch faceplate.

FIG. 1 shows a side view of the three-point hitch faceplate 10 and FIG. 5 shows a rear view of the three-point hitch faceplate 10, which is made of metal. The three-point hitch faceplate 10 comprises a rigid rectangular shaped member 11 having a front face 11a, a rear face 11b and a rearward extending top lip 12 to form mating engagement with a conventional skid steer attachment and a bottom angled lip 11c that engages a locking mechanism to hold an attachment on the three-point hitch faceplate 10. Mounted on the rear face 11b of faceplate 11 is a first connecting member 52 and a second connecting member 50 with connecting members 52 and 50 laterally spaced from each other and secured to the back side 11b of rigid member 11. The first connecting member 52 is connectable to a first tractor mount (not shown) through a pin 53 and the second connecting member 50 is connectable to a second tractor mount (not shown) through a pin 51. A third connecting member 13 is secured to the back side 11b of rigid member 11 with the third connecting member spaced from a straight line connecting the first connecting member 52 and second connecting member 52 to thereby form a portion of a three-point engagement with the rigid plate 11.

In the present embodiment a two way hydraulic cylinder 20, which is extendible and contractable, has a first end 21 for connecting to third tractor mount and a second end 22, pivotally connected to the third connecting member 13 to thereby form an extendible link between the third tractor mount (not shown) and the third connecting member 13 to allow a user to position the rigid member 11 for attachment to a skid steer attachment.

The use of an extendible link, in this case a hydraulic cylinder, allows one to move the top lip 12 back and forth to enable one to engage the lip 12 with a skid steer attachment without having to move the tractor. Thus the hydraulic cylinder 20 allows one to provide additional motion to the conventional motion of a three-point hitch. As a result an operator can manipulate the three-point hitch faceplate 10 to enable one to pick up and engage skid steer attachment. A set of spaced apart openings 38 and 39 are positioned in member 11 so as to allow skid steer attachment links (not shown) to penetrate through the rigid member 11 so that the skid steer attachment can be locked on the faceplate 10 by extending a pin through the links. Although pin fasteners are shown, other means of locking the attachment to the three-point hitch faceplate can be used.

Figure 2:
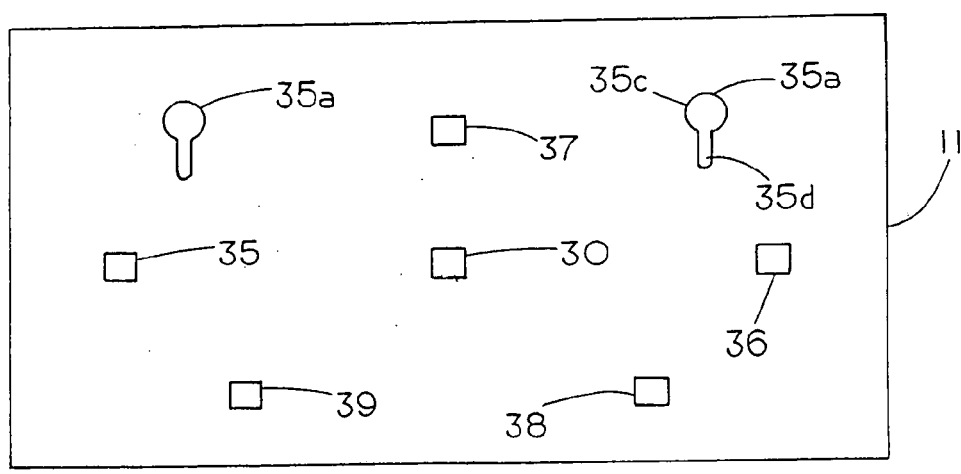
FIG. 2 is a front view of the three-point hitch faceplate of FIG. 1.

The embodiment shown in FIGS. 1, 2 and 5 allows one to use a conventional agricultural tractor with a three-point tractor mount to operate skid steer attachments.

While the present invention comprises a three-point hitch faceplate 11 to enable an operator to use skid steer attachments on a tractor with a three-point hitch it also allows an operator to use the three-point hitch faceplate 11 for securement of a trailer hitch or a drawbar.

FIG. 2 shows a front view of rigid member 11 having a first box member 32, a second box member 35, a third box member 36 and a fourth box member 37 which are secured to plate 11 through welding or the like. Each of the box members can receive a conventional ball hitch or receiver hitch, which can be temporarily secured thereto to enable the tractor to be used for towing.

FIG. 1 shows the ball hitch 25 includes a member 26 for mating insertion with any of the box members. Member 26 includes a through hole 26a that allows one to insert pin 28 there through and latch the pin with key 29. For example, member 26 is inserted into box member 30 and the holes 26a and 31 are aligned and the pin 28 is inserted thereto and latched with key 29 to maintain the trailer hitch 25 in position. The operator can now use ball 27 on the ball hitch 25 to move a towable vehicle from one location to another.

FIG. 3 shows an alternate towing attachment comprising a U-shaped drawbar 65 having a set of holes 67 for equipment mounting. Located at one end is a member 63 having an opening 64 and located at the other end is a member 61 having an opening 62. The members 61 and 63 are so spaced so that they can be engaged with box members 35 and 36 to thereby provide a quick mount horizontal drawbar on the unit.

While the drawbar 65 is shown as a quick connect unit the drawbar could be welded or bolted to a separate three-point hitch faceplate which would allow one to convert a conventional three-point hitch on an agricultural tractor to a drawbar hitch through the use of the three-point hitch faceplate.

FIG. 3A shows an alternate embodiment of a hitch having a pivotable drawbar 65A that is rotatably supported in link 63A by extension 65C and on the other end by extension 66A by extension 65D. In the embodiment shown in FIG. 3A the members 63A and 66A are attached to the three-point hitch faceplate.

FIG. 4 shows an alternate ball hitch 70 wherein the ball hitch 70 includes a brace member 72 having an end for engaging an upper box member such as box member 37 and a lower member having an end for engaging a lower box member such as box member 32. The use of pins 76 and 73 allows one to lock the ends of the members to their respective box members. Thus in this embodiment one can provide for a reinforced ball hitch to handle a greater torque load since the ball hitch 70 is supported on two positions.

A feature of the tow hitches shown in FIG. 3 and FIG. 4 is that they can be quickly attached to the three-point hitch faceplate 11 so an operator can perform different tasks without having to remove the three-point hitch faceplate. In addition, the three-point hitch of the tractor can be converted to a drawbar towing attachment or a ball towing attachment and still be operated through the three-point hitch.

FIG. 6 is a perspective of an alternate embodiment of a three-point hitch faceplate 80 having multiple attachment points 35, 30, 36 and 37 to enable attachment of articles at any of a number of different attaching points. The rigid plate 80 has a triangular lip 80b and 80c for engaging with a skid steer attachment.

Figure 6A:
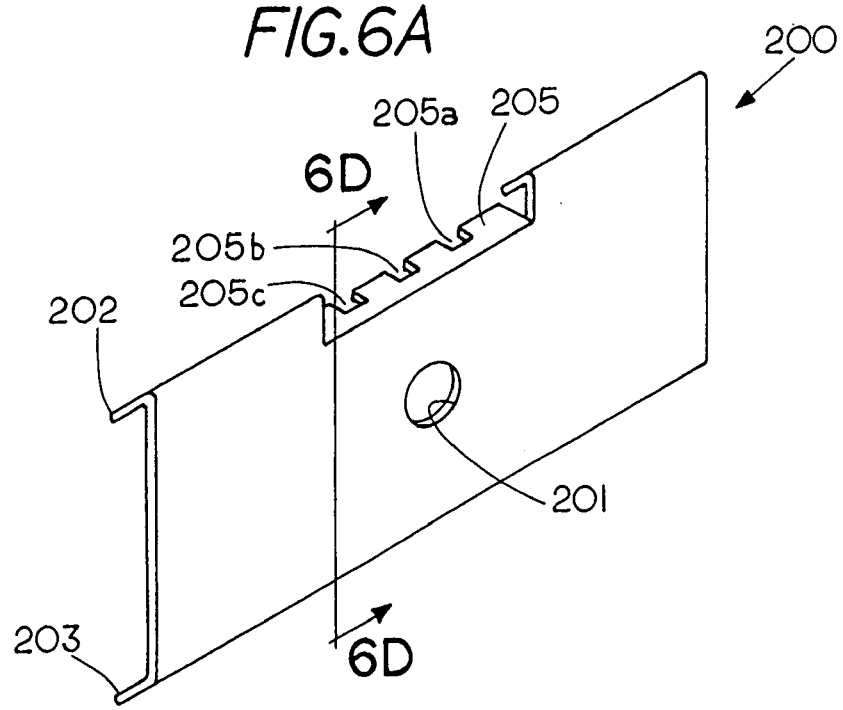
FIG. 6A is a perspective of a faceplate with the chain latch and a housing that permits rotation of a tool without removal of the tool.

FIG. 6A is a perspective of a faceplate 200 having a cylindrical housing 201 for receiving and rotationally journaling with a tool such as a grapple hook or the like. The journaled attachment allows one to rotate the tool to enable attachment of the tool at any of a number of different angular orientations. The rigid plate 200 has an upper triangular lip 202 and a lower triangular lip 203 for engaging with an attachment for a skid steer. Located on the top portion of faceplate 200 is a chain latch member 205 having a set of spaced apart chain link slots 205a, 205b and 205c therein. The chain latch member extends in a direction generally normal to front face the faceplate 200 as illustrated in FIG. 6D to provide enhanced support for a chain positioned therein.

Figure 6B:
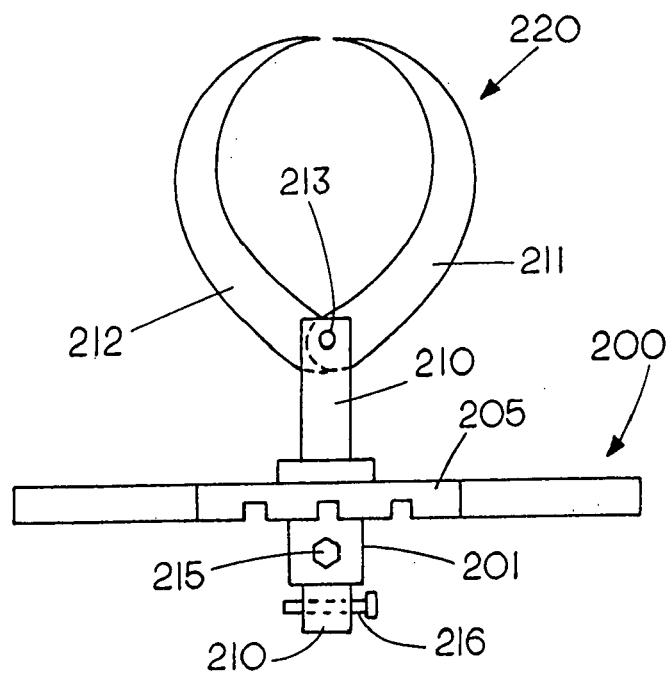
FIG. 6B is a top view showing a grapple hook tool with the grapple hook extending in a normal direction from the faceplate.

FIG. 6B shows a top view of faceplate 200 with the tool comprising a grapple hook 220 mounted in the housing 201 on faceplate 200. Housing 201 has a generally circular opening to permit a journaled insertion of the circular shaft 210 of grapple hook 220 into the housing. A first pin 216 extends through a hole in shaft 210 to axial restraint shaft 210 but permit rotation of shaft 210 about its axis. That is the pin 216 and the flange 218 restrain shaft 210 from axial displacement but permit rotation within the housing 201 since pin 216 is located outside of housing 201. To prevent rotation of shaft 210 the housing 201 includes a set of holes so that a pin 215 can be extended diametrically through both the housing 201 and the shaft 210 to prevent rotation of the shaft 210 with respect to housing 201.

In certain applications it may be necessary for on-the-go rotation of the tool to a different orientation. If the tool is heavy or bulky one does not want to remove and reinsert the tool at a different position. By having the shaft 210 circular and slighther smaller than the circular opening in the housing 201 one creates a journaled relationship that allows one to rotate the shaft 210 to the desired orientation by temporarily removing pin 215. While the shaft and housing are shown being mechanically pinned to prevent rotation one could provide for hydraulic operation of the system. That is, if desired one can maintain the angular orientation of the tool in the housing 201 with a hydraulic cylinder or one could change the angular orientation with a hydraulic cylinder or other power device.

Figure 6C:
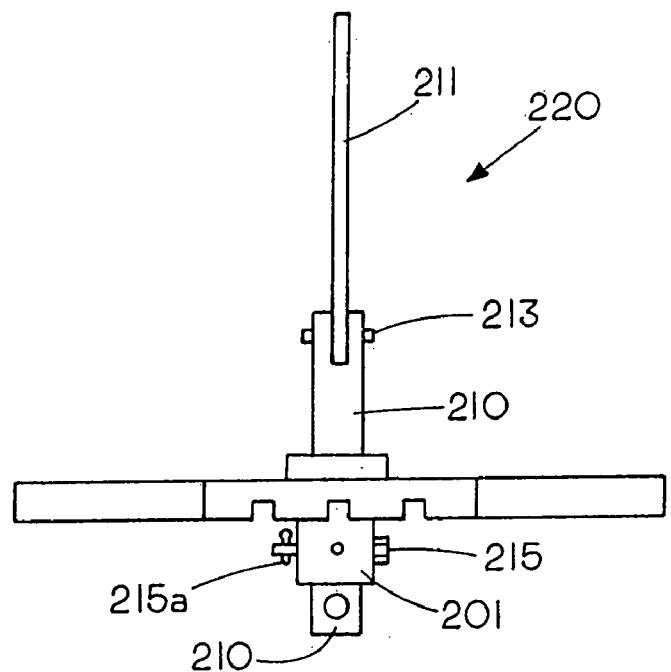
FIG. 6C is s a top view showing a grapple hook tool with the grapple hook extending in a vertical direction
Figure 6D:
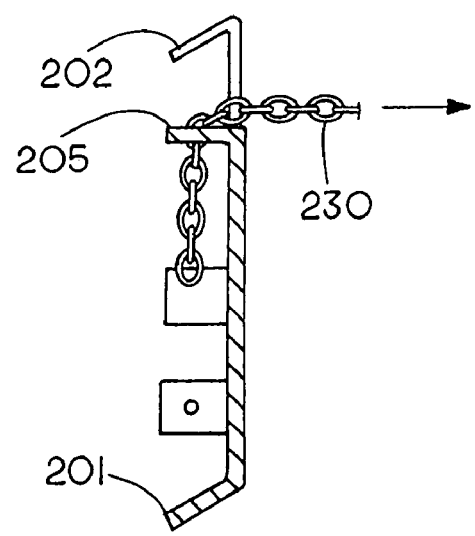
FIG. 6D is a cross sectional view showing a chain securede in a chain latch bar.

FIG. 6C shows the shaft 210 rotated 90 degrees and the pin 215 extended thorough the housing 201 and the shaft 210 with a cotter pin 215a extended through an opening in the pin 215 to retain the pin 215 in position and thereby prevent rotation of shaft 210 with respect housing 201. As can be viewed in FIG. 6C and FIG. 6D one can rotate the grapple hook 220 from one position to another position without having to lift the hook since the housing forms a journaled relationship with the shaft to permit rotation of the shaft 210.

Once rotated to the proper position the shaft 210 can be mechanical pinned to housing 201 to rotationally retain shaft 210 in the desired angular orientation.

FIG. 6D shows the faceplate 200 in cross section to reveal that a force F on the chain acts in a direction generally normal to the faceplate 200 as the chain links 230 extend through a vertically extending chain notch in the faceplate. That is chain latch bar 205 extends generally normal to the faceplate 200 and thus provides a stiffing effect through formation of a right angle between the front of faceplate 200 and the rearward extending chain latch bar 205.

Figure 6E:
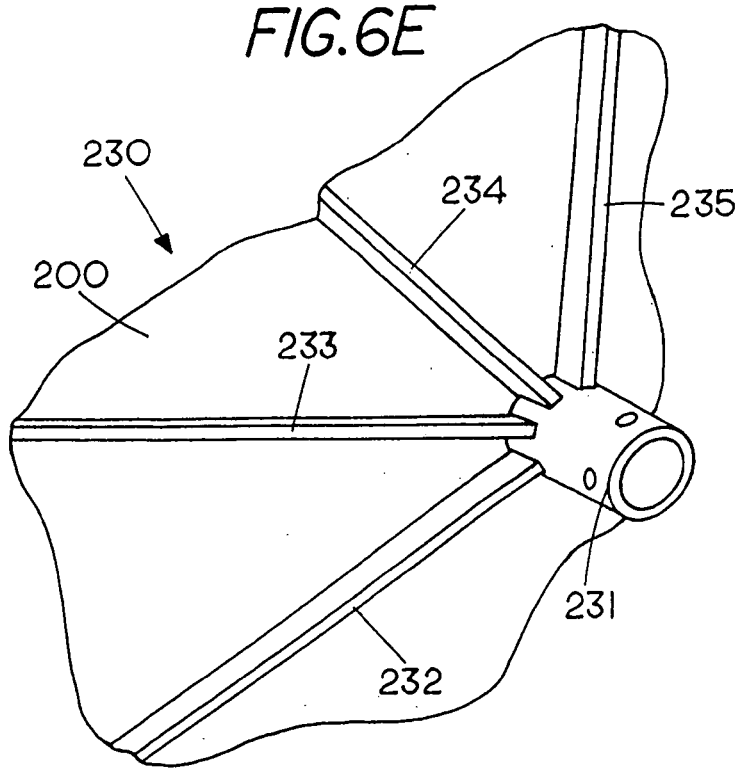
FIG. 6E is a perspective view of a faceplate with the housing for a grapple hook or the like mounted to a front portion of the faceplate through radially extending spokes.

FIG. 6E is a perspective view of a faceplate 230 with the housing 231 for a grapple hook or the like mounted to a front portion of the faceplate 230 through a set of radially extending spoke supports 232, 233, 234 and 235 which are mounted on the front side of the faceplate 230. The front mounting feature permits the faceplate mounting on those tractors or the like that may have some feature that may cause a rear mounted housing to interfere with the operation of the hydraulics or other components on the tractor.

Figure 6F:
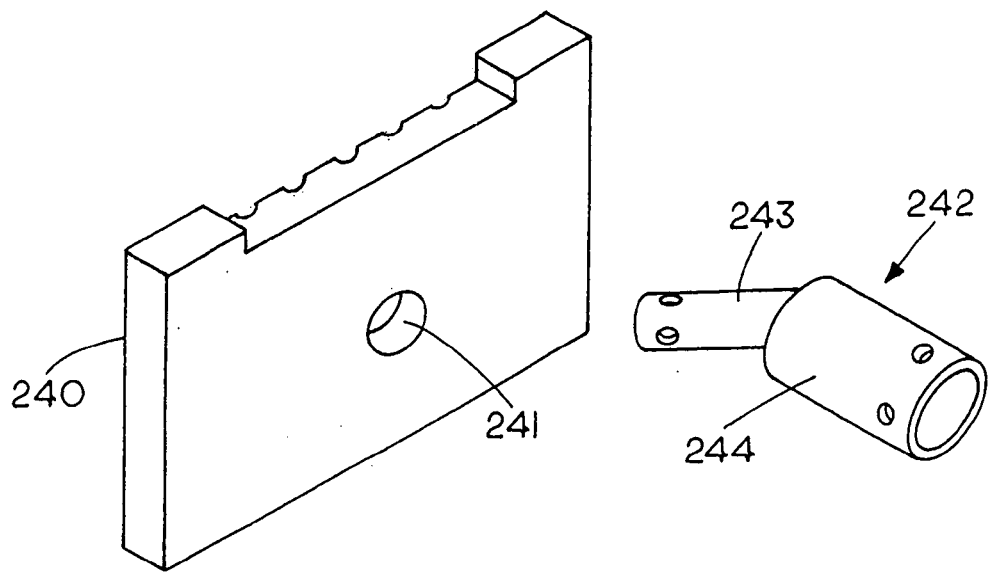
FIG. 6F is a perspective view of a faceplate with a housing located therein that extends at an angle through the faceplate and an angled shaft for engagement with the faceplate.

FIG. 6F is a perspective view of a faceplate 240 with an angled housing 241 located therein that extends at an angle of about 45 degrees through a front face of faceplate 241. In this embodiment one can use an angled shaft 243 having a cylindrical engagement end 243 and a housing 244 for receiving a tool such as a grapple hook or the like. By having the angled shaft 243 journaled in housing 241 one can rotate the angled shaft 243 to provide for extending the housing 244 at different angles with respect to the faceplate 240. For example, mounted as shown the 45 degree angle on the housing in the faceplate and the 45 degree angle of the shaft compliment each other to hold a central axis of housing at a 90 degree angle to the faceplate 240. By rotating the shaft 243 one can change the angle of the housing with respect to the faceplate angled housing to produce a different angle for the grapple or other device secured to housing 244.

FIG. 6G is a perspective view of a universal tractor attachment for a faceplate of the present invention. The faceplate 250 includes a set of two identical dovetail shaped wings 255 and 251 that are secured to the outer lateral ends of faceplate 250 by welding or the like. Wing 255 has a generally trapezoidal shape recess therein often referred to as a dovetail recess. The wing includes a front surface 252 and a parallel spaced back surface 256 with end face 254 and end face 253 angled toward each other. As wing 251 is identical to wing 255 it is not described herein.

Positioned proximate to wing 255 is a first tractor mount 260 that comprises a rigid plate having a three sided trapezoidal recess defined by surfaces 263, 264 and 265. The tractor mount trapezoidal recess is dimensioned so as to slide over the dovetail shaped wing 255 with the tractor mount and the wing forming two way dovetail engagement with each other. The tractor mount 260 can be laterally positioned on wing 255 and an identical tractor mount (not shown) can be similarly laterally positioned on wing 251 to allow one to mount the faceplate 250 to tractors that have different spacing for their front loader supports.

Once the tractor mount 260 is positioned on the wing the tractor mount can be secured to the wing by bolts or the like to restrain the tractor mount 260 from lateral displacement with respect to the wing 255. A set of openings 262 and 261 in tractor mount 265 permit one to attach a typical front end hydraulic loader to the faceplate 250. To mount the faceplate 250 to a different size tractor one can either use different size tractor mounts or additional holes can be formed in the tractor mount 265 to accommodate the spacing of front loader attachments on other tractors.

FIG. 7 is a perspective view of a hook 81 having an extension 82 for securing to the housing in the three-point hitch faceplate with the hook 81 including a first lip 85 with a second lip 83 spaced therefrom with a toggle 84 pivotally mounted to assist in retaining objects carried by hook 81.

FIG. 7A is an alternate embodiment of a hook 81a an extension 82a for securing to the housing in the three-point hitch faceplate with the hook 81a including a first lip 85a with a second lip 83a spaced therefrom with a pin 84a slideably mounted to assist in retaining objects carried by the hook.

FIG. 8 is a perspective view of a loop type attachment device 86 for securing to the three-point hitch faceplate with the attachment device having a bar 89 having an extension 87 for engagement with the housing on the faceplate. An opening 88 extends through extension 86 to permit one to lock the attachment device 86 in position. Articles can be secured to bar 89 by passing through the opening 90 therein.

FIG. 8A is a partial side view showing the type of open box housing 92 on a three-point hitch faceplate 91 with the box housing having an opening 97 with a square cross section for receiving an extension from an attachment device. A first hole 93 extends through the housing 92 in one direction and a second hole 94 extends through the housing in a different direction and is shown with a pin 95 for locking an attachment extension to the three-point hitch faceplate with the pin 95 including a cotter pin 96 to maintain the pin 95 in the housing 92.

FIG. 8B is a perspective view of an alternate embodiment of a hitch comprising an extension 87A FIG. 9 is a perspective showing a portion of the rear of an agricultural tractor 100 with the three-point hitch faceplate 101 mounted to the three-point hitch of a tractor through a set of upward extending bars 102 that are pinned to a connector 103 that attaches on one end to the three-point hitch of the tractor and on the other end to the arms 102 through a pin 104 that extends through the bars 102. The faceplate 101 is shown with a set of housings 101a located along the bottom of the faceplate 101.

FIG. 10 is a perspective showing a fork lift 104a attached to the three-point hitch faceplate 106 with the fork lift having an upright member 105 and a set of three tines 107, 108 and 109 for lifting items including hay bales or the like.

Figure 11:
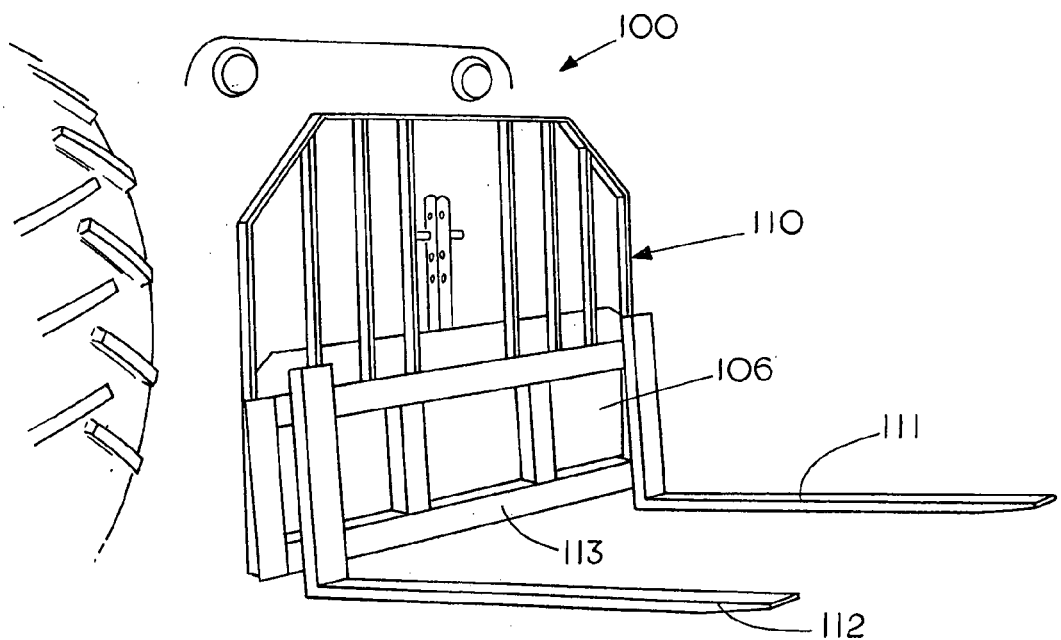
FIG. 11 is a perspective showing a fork lift with lateral positionable arms secure to the three-point hitch faceplate.

FIG. 11 is a perspective showing a fork lift 110 mounted on tractor 100 with the fork lift having lateral positionable arms 111 and 112 which are secured directly to the three-point hitch faceplate 106 by frame 113.

Figure 12:
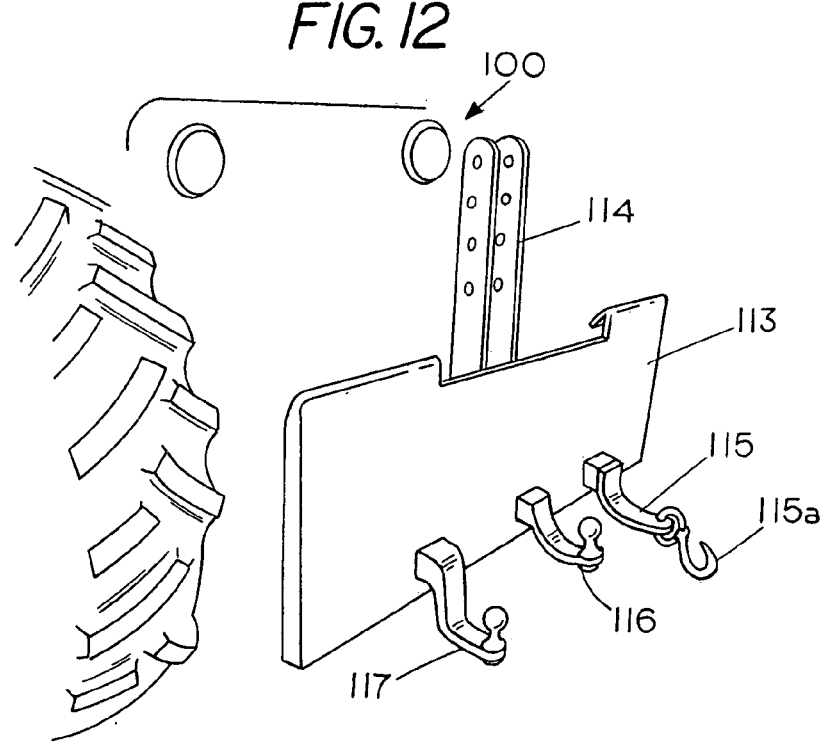
FIG. 12 is a perspective showing a number of different hitch members mounted to the three-point hitch faceplate.

FIG. 12 is a perspective showing a three-point hitch faceplate 113 having a first ball hitch 117 mounted thereon and a second ball hitch 116 mounted thereon. A further attachment 115 includes a hook 115a. Thus the embodiment of FIG. 12 provides for multiple attachment points with multiple types of attachment members.

Figure 13:
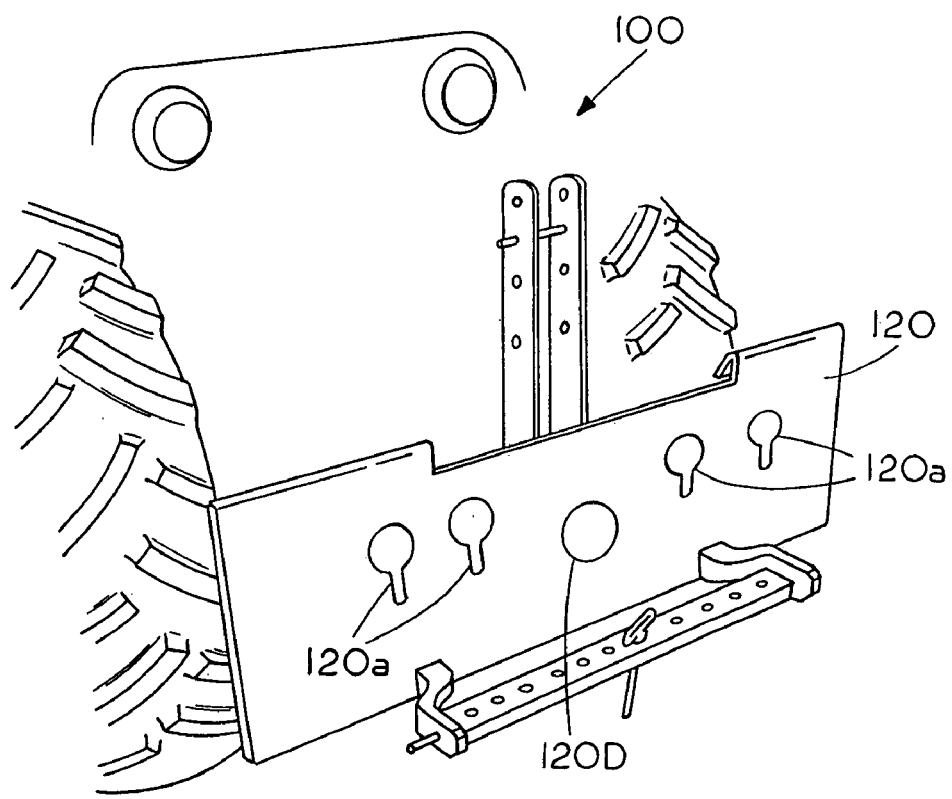
FIG. 13 shows an alternate embodiment of the three-point hitch faceplate with a set of slots for holding a chain therein.

FIG. 13 shows an alternate embodiment of the three-point hitch faceplate 120 mounted on tractor 100 with a set of keyhole slots 120a for holding a chain therein. A chain is placed through the large opening in the top and the links passed down into the lower portion of the keyhole slot to enable an adjacent link to engage the sides of the faceplate 120. An opening 120D permits insertion of a chain, cable or the like through faceplate 120. In order to provide for smooth passage therethrough a set of rollers could be positioned on the edge of the opening to allow passage therearound.

Figure 13A:
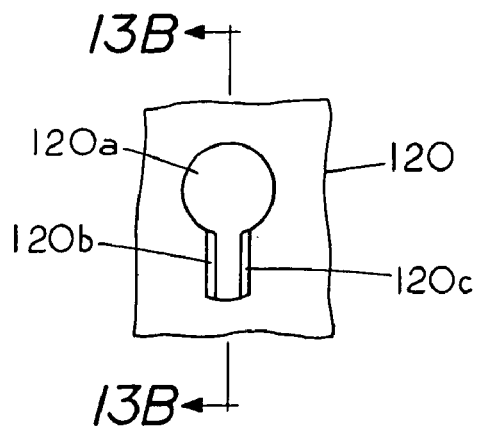
FIG. 13A shows a back view of a portion of the three-point hitch faceplate located around the chain lock.
Figure 13B:
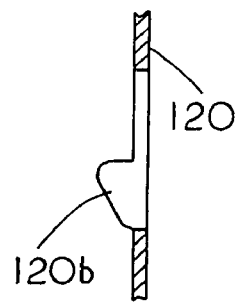
FIG. 13B shows a side view of the three-point hitch faceplate with the lips of the chain lock extending outward from the three-point hitch faceplate.

FIG. 13A shows a back view of a portion of the three-point hitch faceplate 120 located around the chain lock 120a with flanges 120b and 120c protruding outward from the elongated portion of the keyhole opening 120a. To appreciate the flanges, reference should be made to FIG. 13B which shows a side view of the three-point hitch faceplate with the lips or flanges 120b projecting outward from the backside of three-point hitch faceplate 120.

Figure 14:
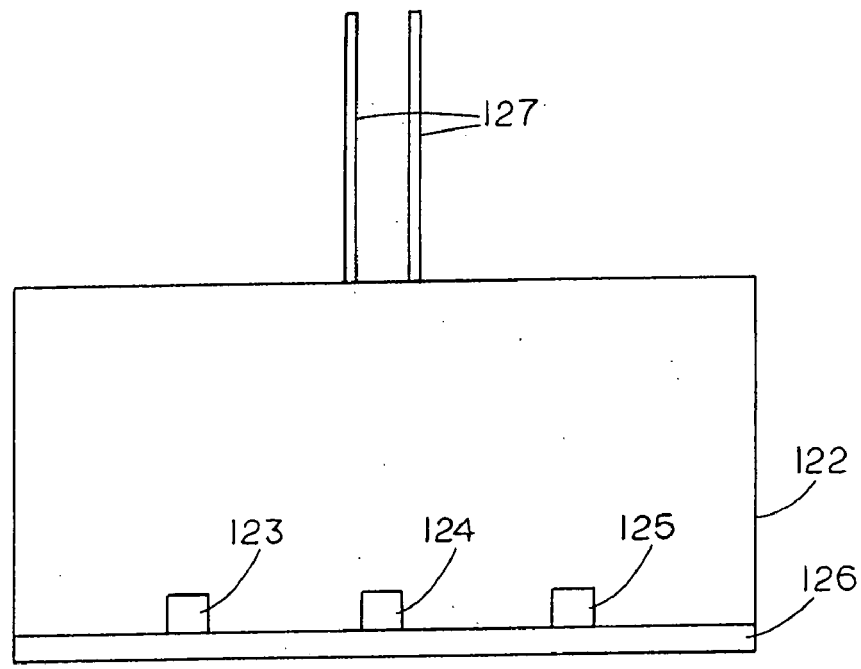
FIG. 14 shows a front view of the three-point hitch faceplate with three receiver hitch housing on the bottom of the unit for mounting attachments therein.

FIG. 14 shows a front view of the three-point hitch faceplate with three housing units 123. 124 and 125 on the bottom of the unit for mounting attachments therein and a hardened blade 126 extending along the bottom to permit the use of the faceplate as a leveling tool. A set of spaced apart extension arms extend upward from faceplate 122.

Figure 15:
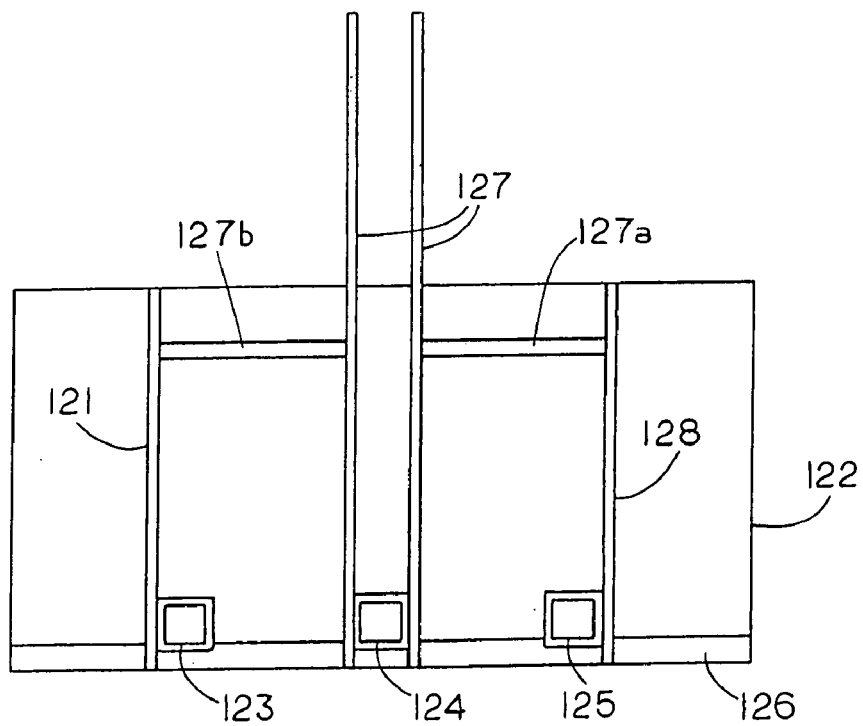
FIG. 15 shows a back view of the three-point hitch faceplate of FIG. 15.

FIG. 15 shows a back view of the three-point hitch faceplate 122 revealing stiffening members 121 and 128 extending transverse to the faceplate 122 as well as housings 123, 124, and 125.

Figure 16:
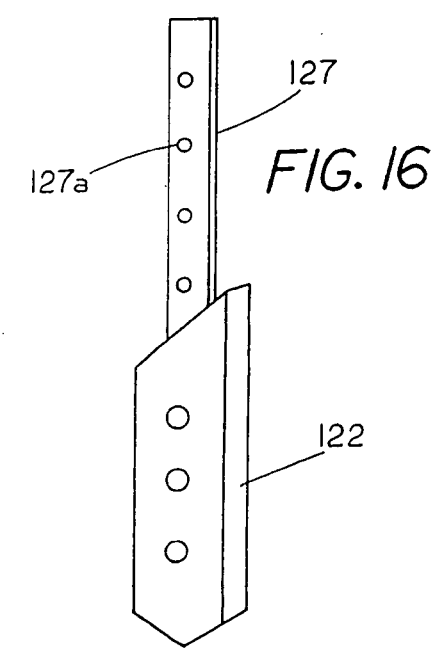
FIG. 16 shows a mechanical positionable arm for securing to the three-point hitch faceplate and the tractor.

FIG. 16 shows a side view of three-point hitch faceplate 122 with the plurality of opening 127a therein to permit mounting of the faceplate to a variety of three-point tractor hitches.

Figure 17:
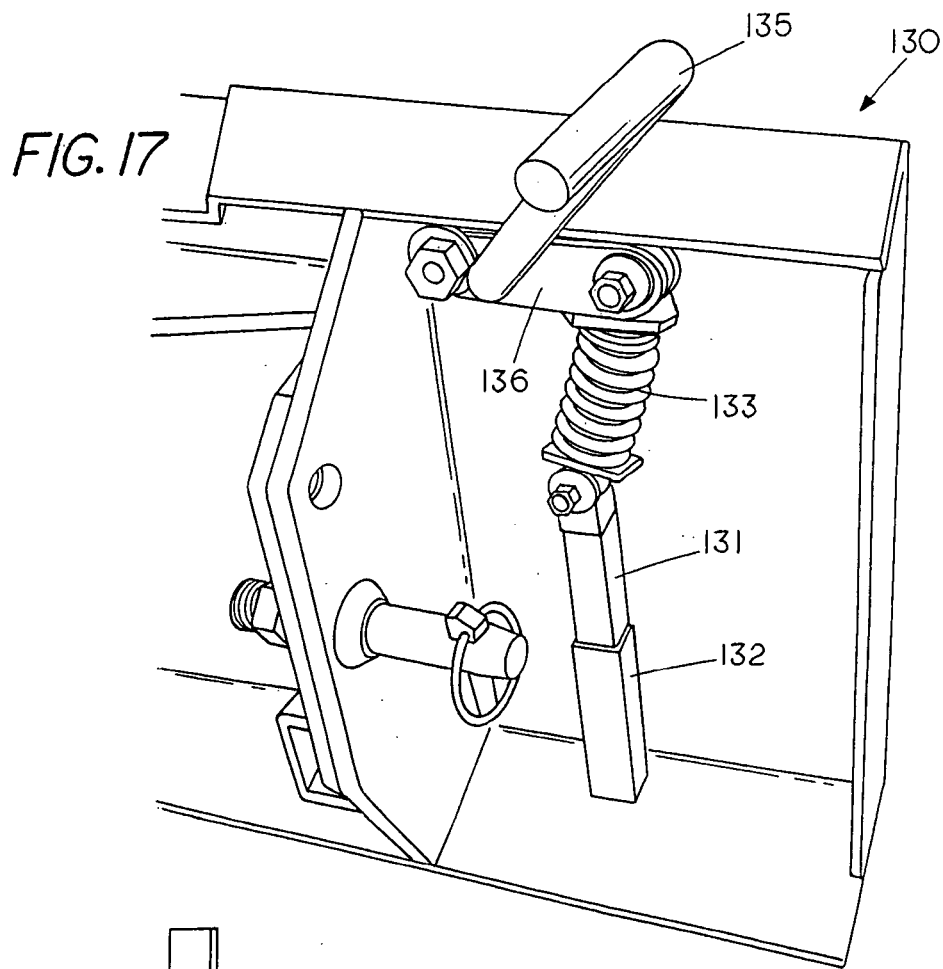
FIG. 17 shows a locking device for locking an attachment to the three-point hitch faceplate in the unlocked condition.

FIG. 17 shows a locking device 130 for locking a skid steer attachment to the three-point hitch faceplate in the unlocked condition. The mechanism includes a member 131 that slidingly extends in housing 132 and can be retracted or extended therein by partial rotation of handle 135 which rotates link 136 to compress spring 133 and force member 131 downward and through housing 132.

Figure 18:
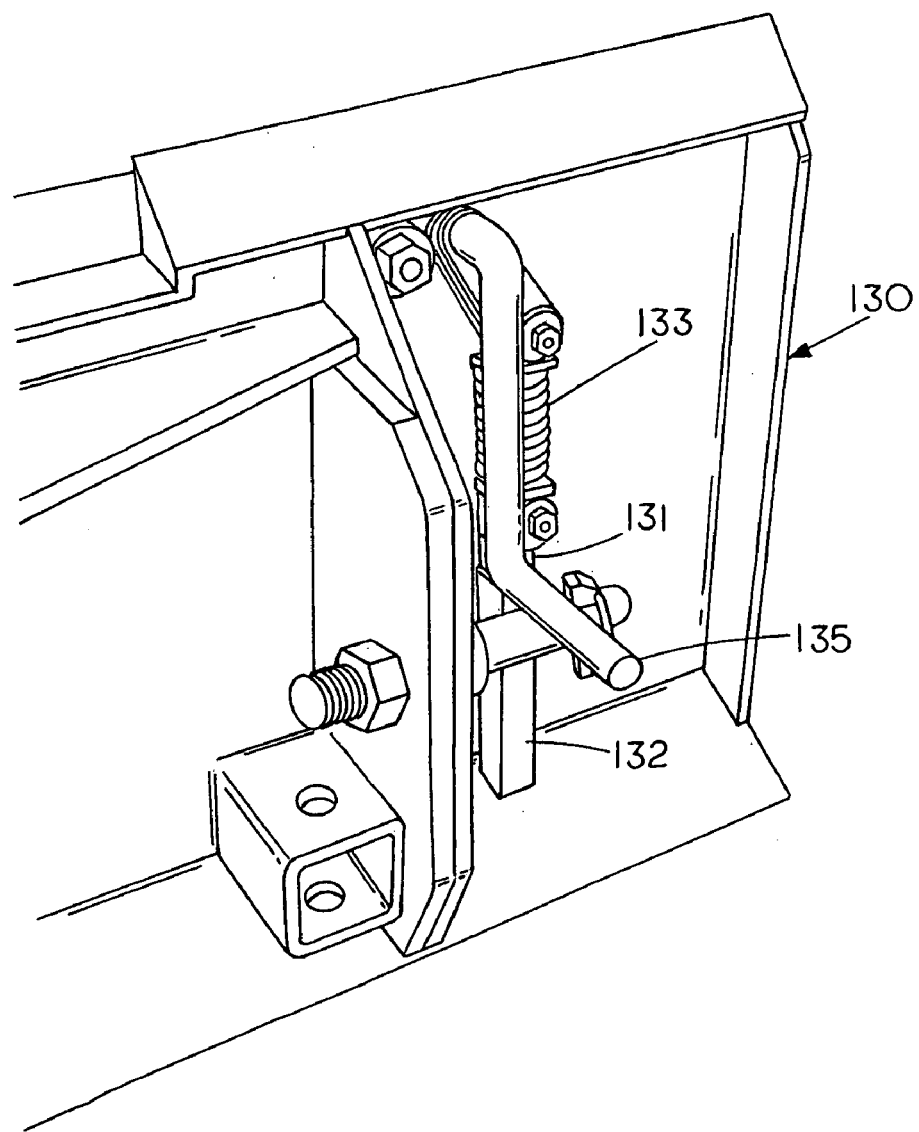
FIG. 18 shows the locking device of FIG. 17 in a locked condition to secure an attachment to the three-point hitch faceplate.

FIG. 18 shows the locking device of FIG. 17 in a locked condition to secure an attachment to the three-point hitch faceplate. In the locked condition the member 131 is extended into housing 132 which cause the member 131 to extend outward of the bottom of the faceplate (not shown) as the lever 135 is rotated clockwise to compress spring 133.

The use of locking mechanism on both side of the faceplate holds the bottom of the skid steer attachment securely against the three-point hitch faceplate and keeps the attachment from slipping at the bottom and also keeps the top of the attachment against a top retainer bar located on top of the three-point hitch faceplate. The lever operated mechanism is hingedly attached to the three-point hitch faceplate on the top to permit engagement or disengagement of an attachment to the three-point hitch faceplate. As an alternate embodiment one could have an extension to permit an operator to lock or unlock the mechanism from the seat of the tractor. Also a hydraulic or relay type mechanism could be used to lock or unlock a skid steer attachment to the three-point hitch faceplate.

While the three-point hitch faceplate has been described secured to the three-point hitch of a tractor the, three-point hitch faceplate could be also secured to a front end loader and could also be configured to other vehicles such as truck, car, four wheel or other utility vehicle.

Figure 19:
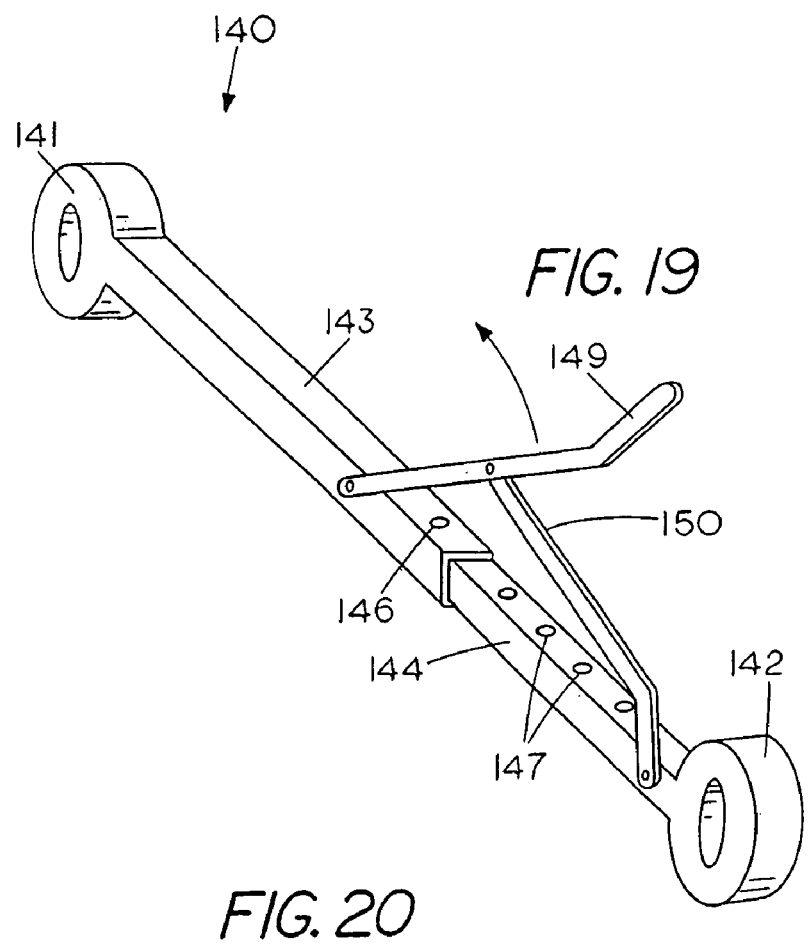
FIG. 19 is a perspective view of a mechanically adjustable top link for securing to the three-point hitch on the tractor and the three-point hitch faceplate.

FIG. 19 is a perspective view of a mechanically adjustable link 140 having a first end 141 and a second end 142 each having an eye therein. Located intermediate is a first member 143 that slides over bar 144 and can be locked in position through hole 146 in member 143 and holes 147 in member 144. A lever arm 149 with a link 150 permits one to extend or retract members 143 and 144 with respect to each other. The mechanical link is suitable for securing to the top link of three-point hitch on the tractor and the three-point hitch faceplate.

Figure 20:
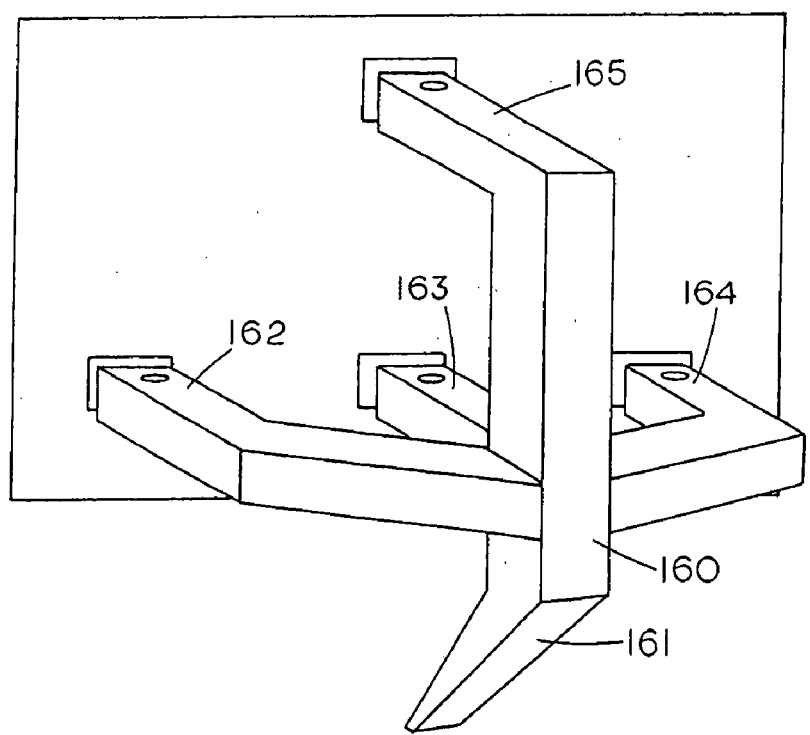
FIG. 20 is a perspective of a tool for tearing a soil furrow for attachment to a three-point hitch faceplate.

FIG. 20 is a perspective view of a furrow device 160 having a top member 165 for engaging a housing member in a faceplate, and three lower member 162, 163 and 164 for engaging lower housing in the three-point hitch faceplate. A tine 161 extends downward at an angle to the horizontal to enable one to tear up the soil as the furrow device is pulled forward.

Figure 21:
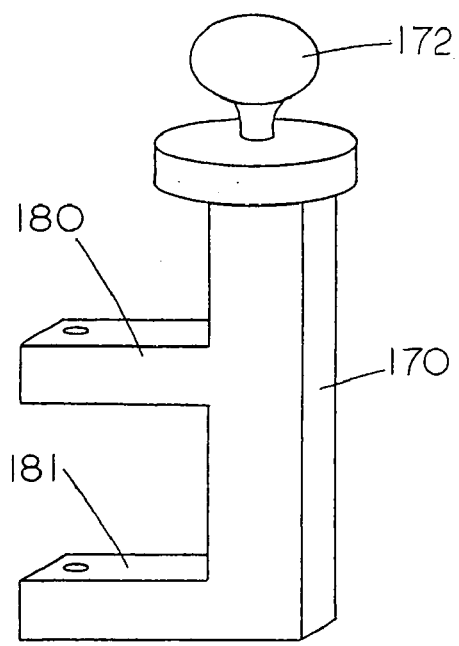
FIG. 21 is a perspective of a fifth wheel attachment for a three-point hitch faceplate.

FIG. 21 is a perspective view of a fifth wheel attachment 170 for mounting on a three-point hitch faceplate with the fifth wheel attachment having the top member 172 supported by extensions 180 and 181 that extend into housing on the three-point hitch faceplate of the present invention.

Figure 22:
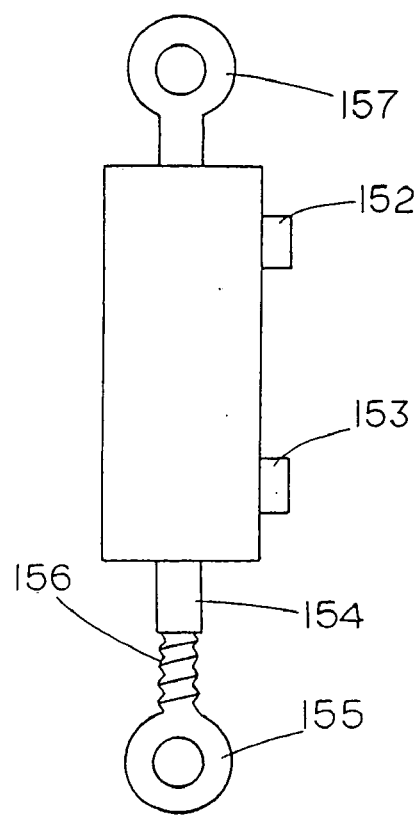
FIG. 22 is a front view of a top link having both hydraulic and mechanical extension.

FIG. 22 is a perspective view of an alternate embodiment of a top link 150 for use with the present invention. Top link 150 includes a two way hydraulic cylinder having hydraulic ports 152 and 153. Located at one end of link 150 is a swivelable eye 157 and located at the other end is an extension rod 154 having a female thread for receiving the male thread 156 formed on the shaft of swivelable eye 155. The rotation of eye 155 provides for the static lengthening or shorting of the link 150 while the hydraulic ports provide means for on-the-go extension and contraction of the top linkage 150.

A feature of the present invention is that the three-point hitch faceplate can be used with a number of different receiver style attachments including but not limited to trailer hitch, draw bar, bale forks, pallet forks, ground ripper, lift boom, tool box, utility box, three-point auxiliary hitch, winch and wood splitter.

Figure 23:
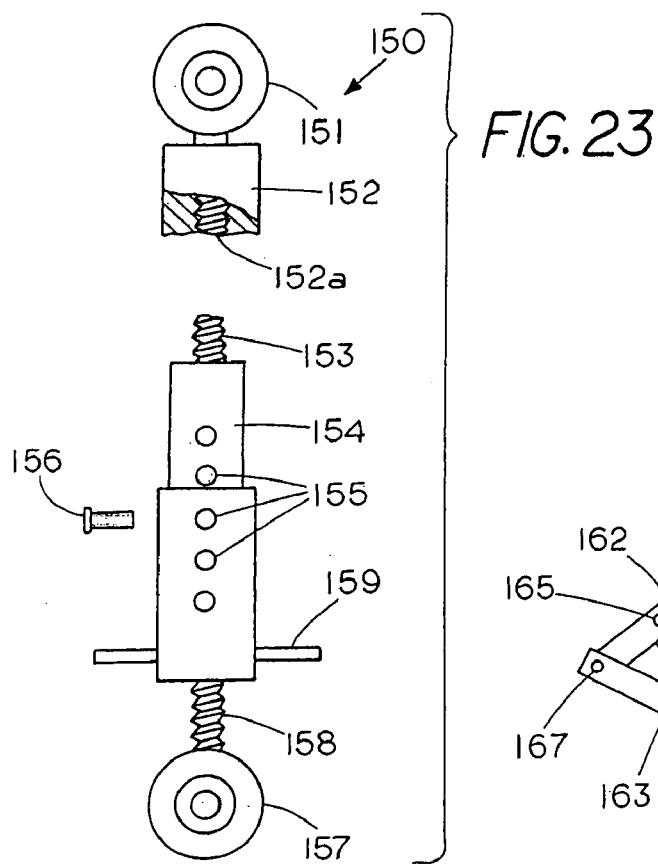
FIG. 23 is a partial section view of an extendible link.

FIG. 23 is a partial section exploded view of an extendible link 150 that includes multiple mechanical adjustments including rotational adjustment and linear extension adjustment. Link 150 includes a swivelable eye 151 that connects to housing 152 that contains female threads 152a that allow one to rotationally fasten housing 152 to male threaded member 153 that extends from member 154. Member 154 slidingly fits in and engages an outer housing enabling one to place pin 156 into any of holes 155 in order to lock the link 150 at a selected length. Similarly, a male threaded member 158 having a swivelable eye 157 forms threaded engagement with a threaded recess (not shown) in housing 159.

Figure 24:
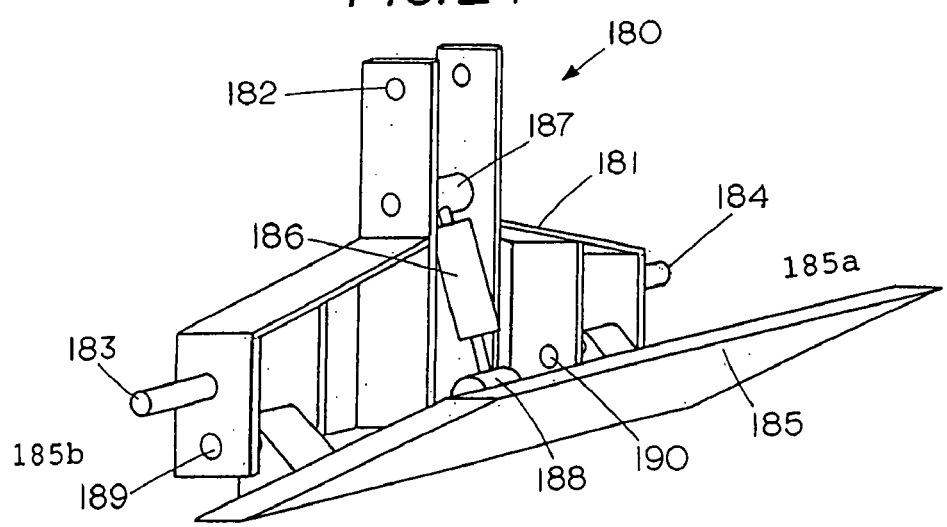
FIG. 24 is a perspective view of an attachment for a three-point hitch which includes a hydraulic ram for tilting the faceplate.

FIG. 24 shows a perspective view of a three-point hitch faceplate frame 180 for connecting to a three-point hitch and to the faceplate of the present invention. Frame 180 includes a top opening 182 for connecting to the top link of the tractor three-point hitch and bottom shafts 183 and 184 for pivotally connecting to the lower members of the tractor three-point hitch. The faceplate 185 is pivotable mounted on one end by shaft 189 and on the opposite end by shaft 190. A hydraulic cylinder 186 having one end 187 connected to the frame 181 and a second end 188 connected to the faceplate 185 allows one to pivot the faceplate 185 though hydraulic cylinder controls (not shown). The incorporation of the frame with a hydraulic link 186 allows one to include the tilt feature of the faceplate in a separate frame rather than as part of a separate top link between the faceplate and the top member of the tractor three-point hitch.

Figure 25:
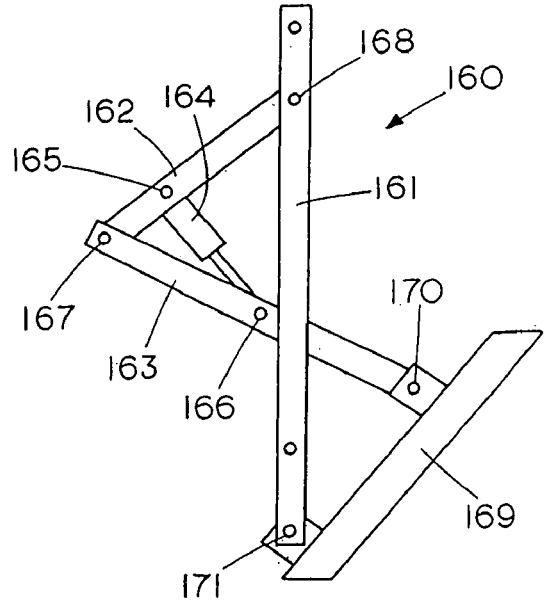
FIG. 25 is a side view of an alternate embodiment of a tilting mechanism for the faceplate attachment of the present invention.

FIG. 25 shows a side view of an alternate embodiment 180 of a frame having separate means for tilting the faceplate 169. Frame 160 includes a rigid member 161 having a lower pivot connection 171 on one end and an upper pivot connection 168 on the opposite end. A link 162 has one end that pivotally connects to link 163 through a pivot pin 167 and the other end that pivotally connects to member 161 through pivot pin 168. The other end of link 163 pivotally connects to the top portion of faceplate 169 through a pivot pin 170. one end of a two-way hydraulic cylinder 164 connects to link 162 through pivot pin 165 and the other end connects to frame 163 through pivot pin 166. In operation the extension and contraction of hydraulic cylinder 164 through hydraulic controls (not shown) allows one to tilt faceplate 169 about the lower pivot pint 171.

FIG. 26 shows a partial perspective view of an alternate embodiment of my three-point hitch faceplate for use on either the front end of a tractor loader or on a three-point hitch of a tractor. Faceplate 200 includes a set of vertical flanges 220, 221, 210 and 211. Flange 210 has a set of openings 210a and 210b and flange 211 has a set of laterally aligned openings 211a and 211b. Similarly, flange 221 has a set of openings 221a and 221b and flange 220 has a set of laterally aligned openings 220a and 220b.

A portion of the front end loader 201 is shown with a hydraulic cylinder 202 and a hydraulic cylinder 203 for lifting and lower front end loader 201. Located on one side of loader 201 is an extension 207 having an opening 207a that can be aligned with openings 210b and 211b to enable a pivot pin (not shown) to be extended therethrough. Similarly, on the other side of loader 201 is an extension 206 having an opening 206a that can be aligned with openings 220b and 221b to enable a pivot pin (not shown) to be extended therethrough. A cross member 205 separates and holds extensions 206 and 207 in position. The pivotal connections of extensions to the faceplate 200 allows faceplate 200 to pivot with respect to an axis through the openings 206a in the arm 206 and the opening 207a in arm 207.

Located on top of extension 207 is a first two way hydraulic cylinder 230 having an extension arm 230a and an eye end 230b for alignment with the opening 210a and 211a to enable a pivot pin (not shown) to be extended therethrough to form a pivoting connection to the faceplate flanges. Similarly, located on top of extension 206 is a two way hydraulic cylinder 231 having an extension arm 231a and an eye end 231b for alignment with the opening 220a and 221a to enable a pivot pin (not shown) to be extended therethrough to form a pivoting connection to the faceplate flanges. This feature allows my faceplate to be pivotally attached to the front end of a tractor. loader.

A central flange 240 and 241 are included to enable one to use a tractor loader with a single hydraulic cylinder in instead of the two lateral cylinders 230 and 231. In addition, one can mount the three-point hitch faceplate 200 on the three-point hitch of a tractor using the central flanges 240 and 241. Thus a feature of the embodiment of FIG. 26 is that the faceplate 200 is a universal faceplate that can be mounted on either the front or rear of a tractor.

We claim:

1. A faceplate comprising:
a rigid member, said rigid member having a front side and a back side;
a chain latch bar mounted on said rigid member with the chain latch bar extending generally normal to a front face of said rigid member;
a first connecting member secured to the back side of said rigid member;
a second connecting member secured to the back side of said rigid member, said second connecting member laterally positioned with respect to said first connecting member, said first connecting member connectable to a first tractor mount and said second connecting member connectable to a second tractor mount;
a third connecting member secured to said rigid member, said third connecting member spaced from a straight line connecting said first connecting member and said second connecting member to thereby form a connection with a third tractor mount; and a housing located in said rigid member, said housing having a cylindrical opening for rotationally mounting a tool shaft therein.

2. The faceplate of claim 1 wherein the faceplate housing includes a set of openings for extending a mounting pin therethrough.

3. The faceplate of claim 1 wherein a shaft of a grapple hook is mounted in the housing on said faceplate.

4. The faceplate of claim 1 wherein the housing is centrally positioned in said faceplate.

5. The faceplate of claim 1 wherein the housing extends rearward of the faceplate to cantileverly support a tool therefrom.

6. A method of operating a faceplate with a work tool comprising the steps of:
   securing a faceplate to an agricultural tractor;
   positioning the faceplate in an engagement with a work tool securing the tool to the faceplate;
   using the agricultural tractor to operate the tool;
   rotating the tool in a housing on the faceplate while the tool is supported by the housing to bring the tool into a different orientation; and
   attaching a link chain to a chain slot in a chain latch bar extending substantially normal to a front face of the faceplate.

7. The method of claim 6 including extending a pin through a shaft of the rotateable tool and the housing to lock the tool in position.

8. The method of claim 6 including the step of extending a pin through a shaft of the tool to axially restrain the tool to prevent an axial withdrawal of the shaft from the housing.

9. The method of claim 8 including extending a pin through a shaft of the tool and the housing to lock the tool in position.

10. The method of claim 6 including the step of rotating the tool about an axis generally perpendicular to a front face of the faceplate.

11. The rigid member of claim 1 wherein the housing in the faceplate is located at an acute angle to a front face of the faceplate.

12. The rigid member of claim 1 wherein the housing in the faceplate is located at an angle of forty five degrees to a front face of the faceplate and a mounting shaft having a forty five degree angle to thereby allow the mounting shaft to be placed normal to the faceplate or at various angular orientation with respect to the faceplate.

13. The faceplate of claim 1 wherein the housing on the faceplate is supported on a front side to the faceplate.

14. The faceplate of claim 13 wherein the housing on the faceplate is supported by a set of spokes extending radially outward from the housing to form engagement with the front side of the faceplate.

* * * * *

UNITED STATES PATENT AND TRADEMARK OFFICE
CERTIFICATE OF CORRECTION

PATENT NO. : 7,226,268 B2  
APPLICATION NO. : 10/877272  
DATED : June 5, 2007  
INVENTOR(S) : John Gustafson et al.

Page 1 of 1

It is certified that error appears in the above-identified patent and that said Letters Patent is hereby corrected as shown below:

In the Specification

Column 1, lines 6-10 should read

Cross Reference to Related Applications

This application ~~claims priority from John Gustafson provisional application 60/437,076 filed Dec 30, 2002 titled Three Point Hitch Faceplate~~ <u>is a continuation in part of</u> John Gustafson regular patent application Ser. No. 10/440,649 filed May 19, 2003 titled Three-point hitch Faceplate <u>which claims priority from John Gustafson provisional application 60/437,076 filed Dec 30, 2002 titled Three Point Hitch Faceplate.</u>

Signed and Sealed this
Eighteenth Day of February, 2014

Michelle K. Lee
*Deputy Director of the United States Patent and Trademark Office*